United States Patent
Carpenter et al.

(12) 
(10) Patent No.: US 11,161,704 B2
(45) Date of Patent: Nov. 2, 2021

(54) SYSTEMS AND METHODS FOR AUTOMATIC UNLOADING OF PARCELS

(71) Applicant: Siemens Logistics LLC, DFW Airport, TX (US)

(72) Inventors: Michael D. Carpenter, Arlington, TX (US); Eric S. Wilson, Flower Mound, TX (US)

(73) Assignee: Siemens Logistics LLC, DFW Airport, TX (US)

( * ) Notice: Subject to any disclaimer, the term of this patent is extended or adjusted under 35 U.S.C. 154(b) by 255 days.

(21) Appl. No.: 16/443,427

(22) Filed: Jun. 17, 2019

(65) Prior Publication Data

US 2020/0391963 A1 Dec. 17, 2020

(51) Int. Cl.

| | |
|---|---|
| *G06F 7/00* | (2006.01) |
| *B65G 67/24* | (2006.01) |
| *G06Q 50/28* | (2012.01) |
| *B65G 43/00* | (2006.01) |
| *G05B 6/02* | (2006.01) |
| *G09G 5/02* | (2006.01) |

(52) U.S. Cl.
CPC .............. *B65G 67/24* (2013.01); *B65G 43/00* (2013.01); *G05B 6/02* (2013.01); *G06Q 50/28* (2013.01); *G09G 5/02* (2013.01); *G09G 2320/0666* (2013.01)

(58) Field of Classification Search
CPC ........ B65G 67/24; B65G 43/00; G06Q 50/28; G05B 6/02; G09G 2320/0666; G09G 5/02
USPC .................................. 700/213–215, 228–230
See application file for complete search history.

(56) References Cited

U.S. PATENT DOCUMENTS

| | | | |
|---|---|---|---|
| 9,738,466 B2 | 8/2017 | Pippin | |
| 10,336,543 B1* | 7/2019 | Sills | B64D 1/22 |
| 2017/0301004 A1* | 10/2017 | Chirnomas | G07F 11/04 |
| 2018/0024554 A1* | 1/2018 | Brady | G05D 1/0088 |
| | | | 701/23 |
| 2019/0062055 A1* | 2/2019 | Hance | G01C 21/343 |

* cited by examiner

*Primary Examiner* — Yolanda R Cumbess (57) ABSTRACT

A system for automatic unloading of articles from a container or trailer comprising a control system comprising at least one processor configured via computer executable instructions to perform automated unloading operations utilizing a plurality of unloading apparatuses, generate, on a display, an identification for each of the plurality of unloading apparatuses, generate, on the display, an identification of an operating status for each of the plurality of unloading apparatuses, monitor the automated unloading operations, automatically detect an exception of an automated unloading operation performed by an unloading apparatus, halt the automated unloading operation based on a detected exception, and modify, on the display, the identification of the operation status of the unloading apparatus indicating that the automated unloading operation has halted.

18 Claims, 5 Drawing Sheets

SYSTEMS AND METHODS FOR AUTOMATIC UNLOADING OF PARCELS

BACKGROUND

1. Field

Aspects of the present disclosure generally relate to the technical field of mail and parcel processing techniques.

2. Description of the Related Art

Parcel delivery services, such as the United Parcel Service (UPS), deal with everything that occurs for every item that they deliver between the origination and the destination across the delivery logistic. Within this scope there are typically multiple instances in which sorting occurs at intervals amid transportation steps. In these incremental, repetitive sorting processes, items are grouped according to geographic areas that are progressively smaller, such that in multiple steps, an individual item finds itself comingled with items that share a subsequent transportation step. Ultimately, this process finds its conclusion in a delivery vehicle loaded with items that share a delivery route. The multi-step process involves repeating a sequence of unloading, sorting, and loading.

The sequence of unloading, sorting and loading is accomplished by an interconnected series of mixed manual and automatic equipment. Each series of equipment can operate at variable rates up to a maximum that may not be exceeded without causing exceptions and reducing effective productivity. An optimal condition (in terms of productivity) is to maintain a steady rate of processing across the interconnected series that near to the maximum rate.

SUMMARY

A first aspect of the present disclosure provides a system for automatic unloading of articles from a container or trailer comprising a control system comprising at least one processor configured via computer executable instructions to perform automated unloading operations utilizing a plurality of unloading apparatuses, generate, on a display, an identification for each of the plurality of unloading apparatuses, generate, on the display, an identification of an operating status for each of the plurality of unloading apparatuses, monitor the automated unloading operations, automatically detect an exception of an automated unloading operation performed by an unloading apparatus, halt the automated unloading operation based on a detected exception, and modify, on the display, the identification of the operation status of the unloading apparatus indicating that the automated unloading operation has halted.

A second aspect of the present disclosure provides a method for automatic unloading of articles from a container or trailer comprising performing unloading operations utilizing a plurality of unloading apparatuses, generating, on a display, an identification for each of the plurality of unloading apparatuses, generating, on the display, an identification of an operating status for each of the plurality of unloading apparatuses, monitoring the unloading operations, automatically detect an exception of an unloading operation performed by an unloading apparatus, halting the unloading operation based on a detected exception, and modifying, on the display, the identification of the operation status of the unloading apparatus indicating that the automated unloading operation has halted.

A third aspect of the present disclosure provides a system for automatic unloading of articles from a container or trailer comprising a plurality of unloading apparatuses, an operator station comprising a graphical user interface including a display and a control system comprising at least one processor configured via computer executable instructions to perform unloading operations utilizing a plurality of unloading apparatuses, generate, on the display, an identification for each of the plurality of automated unloading apparatuses, and generate, on the display, an identification of an operating status for each of the plurality of automated unloading apparatuses.

DETAILED DESCRIPTION

To facilitate an understanding of embodiments, principles, and features of the present disclosure, they are explained hereinafter with reference to implementation in illustrative embodiments. In particular, they are described in the context of being systems and methods for unloading of articles, specifically mail items such as parcels, from a container or trailer. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Various disclosed embodiments include unloading items, such as for example parcels or packages, from a trailer or other container generally without operator intervention. An automated unloading apparatus is provided, wherein a nose ramp of the automated unloading apparatus is moved under a base belt in the trailer and under a first item of a plurality of items in the trailer. As the ramp continues advancing, the item is moved onto a conveyor, which is adapted to carry the item out of the trailer. In embodiments, a stack control curtain maintains the remaining items in a stack or pile during and after removal of the first item, and/or a tensioning mechanism maintains a desired tension on the base belt as the ramp moves under the base belt and the first item.

Figure 1:
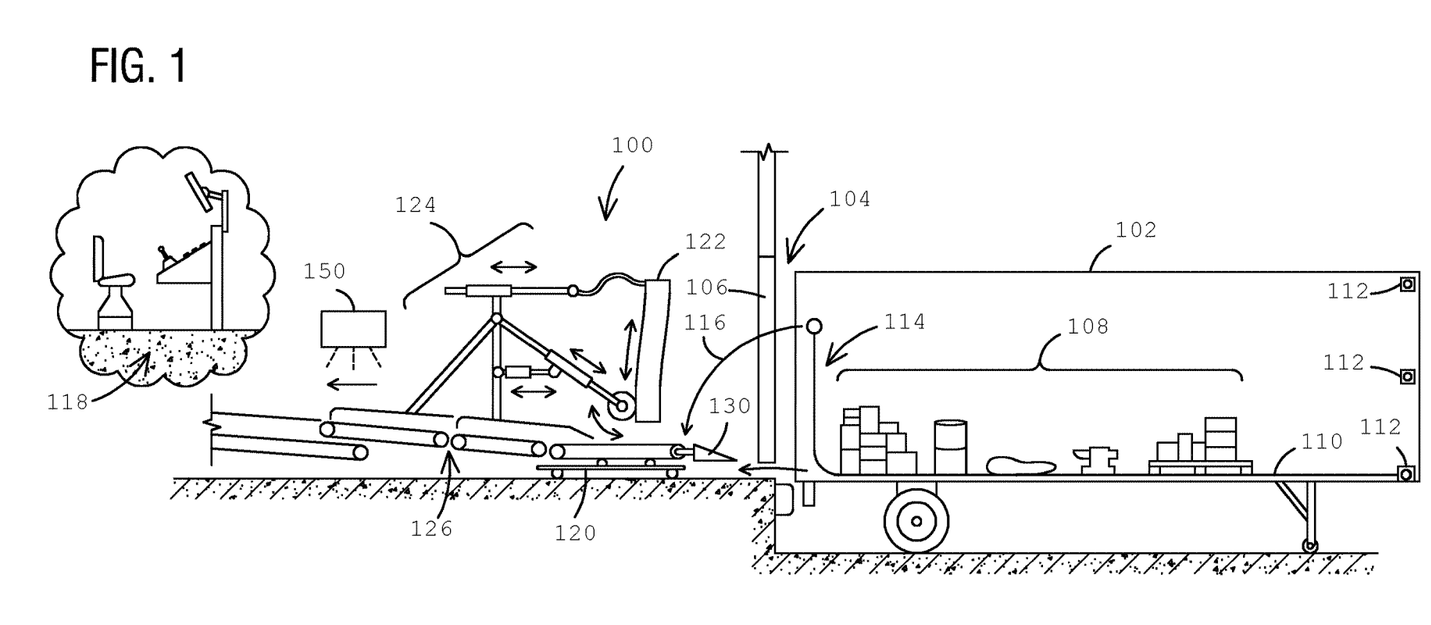
FIG. 1 depicts a schematic view of an unloading apparatus in accordance with an exemplary embodiment of the present disclosure.

FIG. 1 depicts a schematic view of an unloading apparatus 100, herein also simply referred to as unloader 100, in accordance with an exemplary embodiment of the present disclosure.

A trailer 102 is positioned adjacent to a loading dock 104 and a dock door area 106 for unloading. In the trailer 102 are loaded items 108, which are to be unloaded by the unloader 100. The items 108 are positioned on top of a base belt 110, a first end of which is attached to the trailer at an attachment point 112. A second end of the base belt 110 (opposite to the first end) may be raised to a first transit position 114 to provide supported to stacked items during transit to help prevent stack collapse. The second end of the base belt 110 may alternately be placed in a second transit position (not shown in FIG. 1) on the floor of the trailer 102, where the base belt 110 may be rolled or gathered during transit. From either the first or second transit position, to initiate unloading of the trailer 102, the second end of the base belt 110 is brought generally along the path indicated by the arrow 116 to be attached to the unloader 100, as described in greater detail below.

The unloader 100 is positioned at the open door of the trailer 102 by an operator at an operator console 118, also referred to as operator kiosk or station. The operator may use for example a video camera (not shown in FIG. 1) that is mounted to the unloader 100 or to the loading dock 104 and presents the operator with a view of the unloader 100 and the trailer 102.

The unloader 100 includes a positioning mechanism 120, which is remotely operated by the operator to position the unloader 100 at the entrance to the trailer 102. The positioning mechanism 120 may be a motorized caster or other mechanism suitable for positioning the unloader 100 relative to the trailer 102 prior to initiating an unloading process or during the unloading process. The positioning mechanism 120 is operable to position the unloader 100 at least along a longitudinal axis of the trailer 102 or horizontally relative to the trailer 102. In some embodiments, the unloader 100 is substantially a same width as the interior of the trailer 102, such that the unloader 100 substantially fills the trailer 102 from one sidewall to the other sidewall.

The unloader 100 moves into the trailer 102 along the trailer floor, sliding nose ramp 130 under the base belt 110 and under a rearmost item of the items 108. By sliding the nose ramp 130 under an item 108 while the item 108 remains on the base belt 110, the unloader 100 reduces the possibility of the nose ramp 130 pushing the item 108 into the trailer 102, rather than sliding it up onto conveyor 126. When moving forward, the unloader 100 moves at a speed that substantially matches a speed of a transport belt of the conveyor 126. In this way, the items 108 are transferred with substantially no relative motion from the base belt 110 to the conveyor 126. Once on the conveyor 126, a lowest, rearmost item of the items 108 is carried under the stack curtain 122 out of the trailer 102 along the conveyor 126, onto possible further conveyor(s).

The unloader 100 may also include a stack control curtain 122 mounted to a positioning mechanism 124. The unloader 100 is coupled to an extendible conveyor 126, which is operable to carry items unloaded by the unloader 100 from the trailer 102. A sensor 150 may be mounted in a position that enables the sensor 150 to sense items on the unloader 100 or the extendible conveyor 126. The sensor 150 is operable to sense a label, RFID tag, barcode, or other identifying feature of such items.

Further embodiments of the unloader apparatus 100 are described for example in U.S. Pat. No. 8,651,794 B2 to Pippin and U.S. Pat. No. 9,738,466 B2 to Pippin which are incorporated by reference herein in their entirety.

Figure 2:
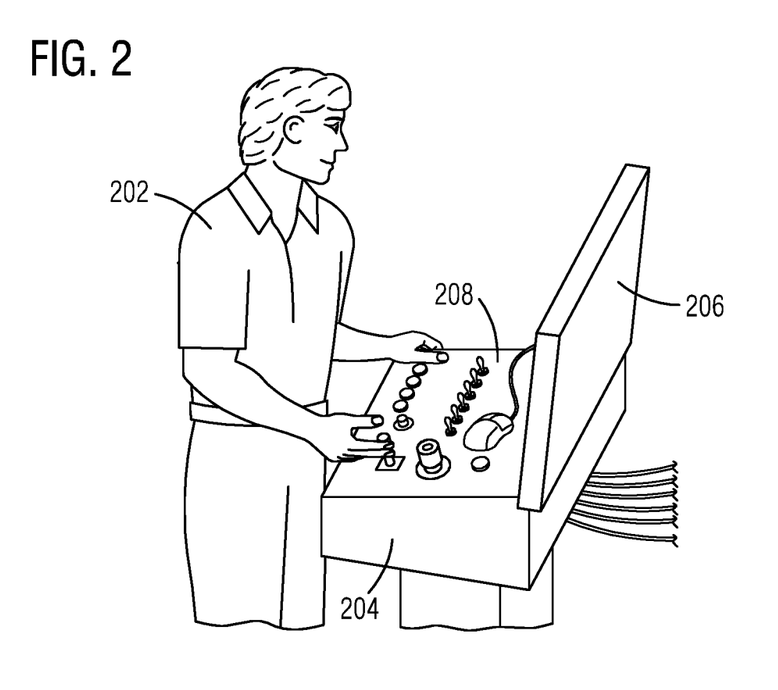
FIG. 2 depicts an example of an operator at an operator station of an unloading apparatus in accordance with an exemplary embodiment of the present disclosure.

FIG. 2 depicts an example of an operator at an operator console of an automated unloading apparatus in accordance with an exemplary embodiment of the present disclosure.

FIG. 2 illustrates an example of an operator 202 at an operator console or station 204 (see also operator console 118 in FIG. 1). Such an operator station 204 is typically configured to control an individual unloader 100 (see FIG. 1), with a one-to-one relationship maintained between the operator 202 and the unloader 100. As shown in the example of FIG. 2, the operator station 204 can include a display 206 and a set of controls 208, wherein the controls and display contents in accordance with disclosed embodiments are described in more detail below. A typical operator station 204 provides simple, direct controls for the operator 202 to perform manual on/off and steering tasks.

A cycle of operation of unloader 100 results in a duty cycle between productive unloading and other non-productive activities of as little as 33%, depending on a speed with which the non-productive activities are carried out. Non-productive tasks include waiting for a trailer to be ready to unload, dock alignment, joining the belt etc. When a one-to-one relationship is maintained between the unloader 100 and the operator 202, this duty cycle represents a significant limitation on productivity of the operator 202. Further, there is significant difference in skills requirements between highly technical, difficult "driving" by the operator 202 and instances in which the operator 202 is simply monitoring the unloader 100 or holding down a button, requiring little technical difficulty. The key role of the operator 202, then, is dealing with intervals of technically difficult actions that occur between intervals in which operation is almost automatic. The operator 202 is thus significantly less productive than should be the case.

Figure 3:
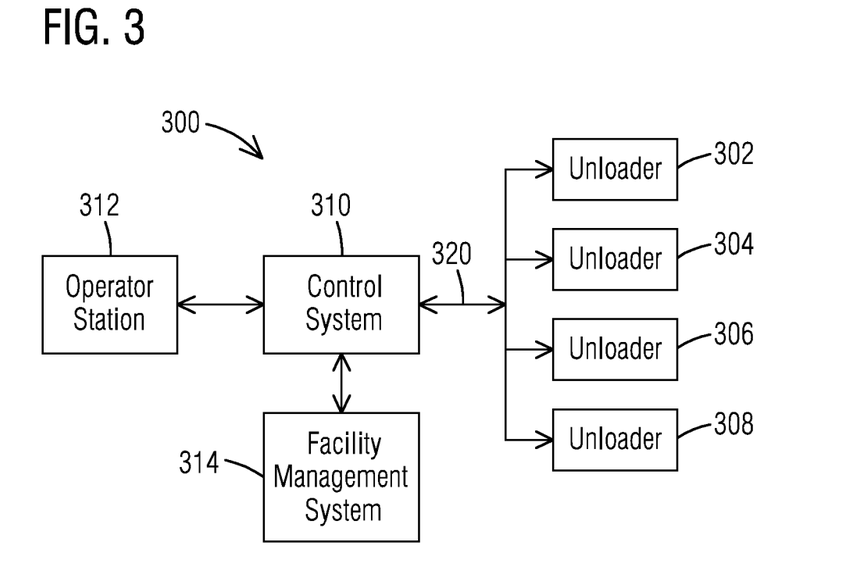
FIG. 3 depicts an unloader system in accordance with an exemplary embodiment of the present disclosure.

FIG. 3 depicts an unloader system 300 in accordance with an exemplary embodiment of the present disclosure.

According to an exemplary embodiment of the present disclosure, multiple automated unloaders, such as unloaders 100 as illustrated in FIG. 1, are operably coupled and controlled by a single control console, such as console 204 as illustrated in FIG. 2. Thus, the one-to-one relationship between individual operator consoles 204 and individual unloaders 100 is broken, and a mode to continue operation automatically provided when simple automatic controls are adequate, for example because arrangement and content of a load presents very few difficulties.

The automated (automatic) unloader system 300 comprises multiple unloaders 302, 304, 306 and 308 which are controlled by control system 310. Each of the unloaders 302, 304, 306, 308 may be positioned at each of four truck docks and operated to unload four trailers separately or concurrently. An operator may use an operator station 312 to control the unloaders 302, 304, 306, 308. It should be noted that more or less than the illustrated four unloaders 302, 304, 306, 308, for example ten (10) or only two (2) unloaders, may be controlled by the control system 310.

The system 300 further comprises a communications network 320 interfacing with the unloaders 302, 304, 306, 308 and the control system 310. In an embodiment, the communications network 320 comprises a wired network, for example Ethernet. In another embodiment, the communications network 320 may comprises a wireless network, for example Internet or Bluetooth®. Accordingly, the control system 310 as well as the unloaders 302, 304, 306, 308 include corresponding interfaces for communicating with each other.

In another embodiment, the control system 310 may be communicatively coupled to a facility management system 314. The control system 310 may receive address or identification information sensed from articles or items unloaded by one or more of the unloaders 302, 304, 306, 308 and send the information to the facility management system 314 (or other external system) for use in routing the articles or items to desired destinations.

While the operator station 312, the control system 310, and the facility management system 314 are depicted in FIG. 3 as separate elements of the unloader system 300, it will be understood that in other embodiments, functionalities of these elements may be provided in one or two elements. In an embodiment of the present disclosure, the control system 310 is integrated in the operator station 312.

In some embodiments, the automated unloader system 300 also includes one or more sensors (not illustrated) providing view(s) of one or more of the unloaders 302, 304, 306, 308 and one or more corresponding trailers or other containers. In such embodiments, the control system 310 is further adapted to control an unloader positioning mechanism to position an unloader in a desired position relative to a trailer, prior to initiating an unloading process.

The detailed structure and operation of some examples of automatic unloader systems in which disclosed systems and methods can be implemented are described in the patent documents incorporated by reference above and are not described in further detail here except when useful to describe the operations of the disclosed embodiments.

Figure 4:
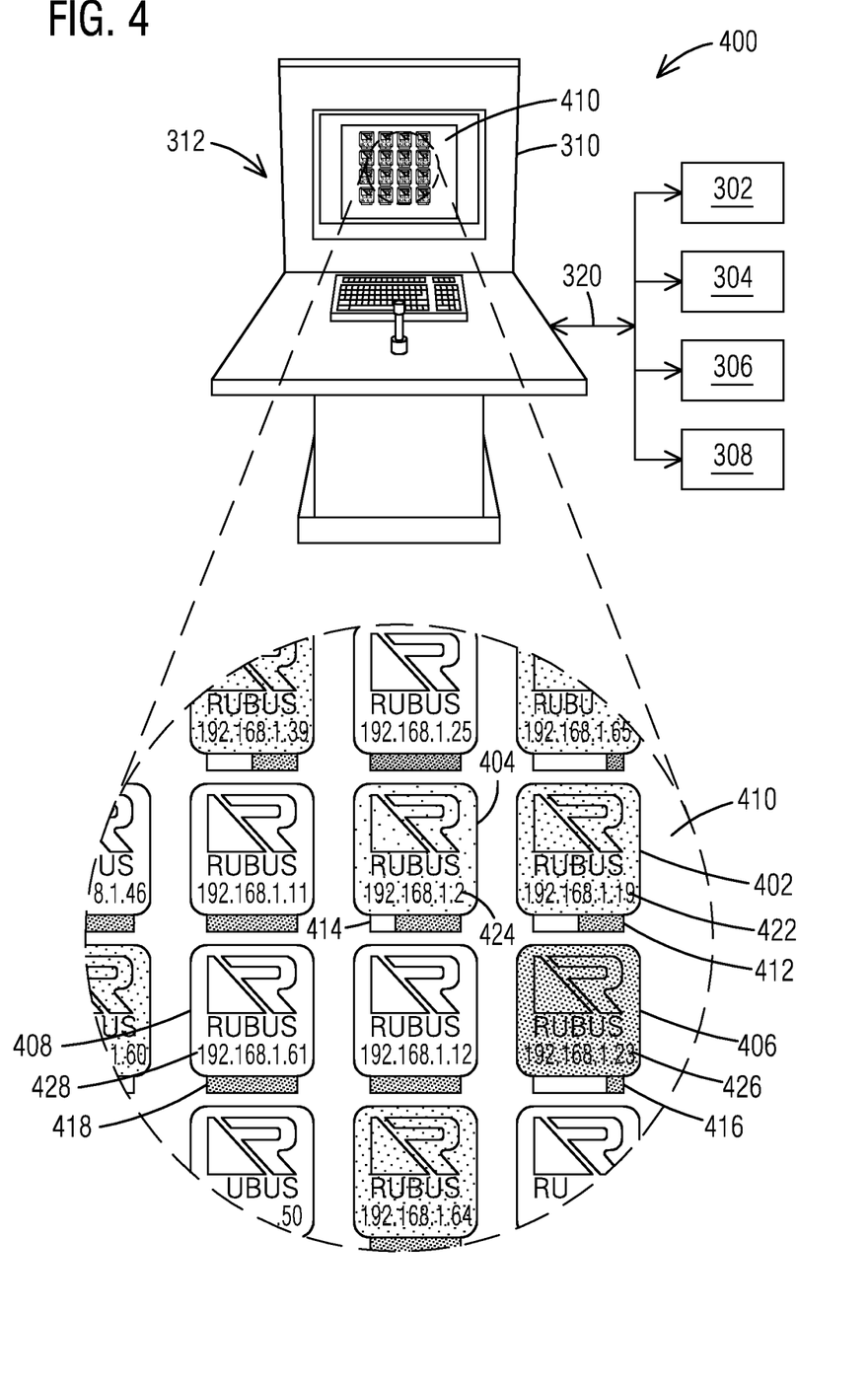
FIG. 4 depicts a section of a display of a graphical user interface of an unloader system, as illustrated for example in FIG. 3, in accordance with an exemplary embodiment of the present disclosure.

FIG. 4 depicts a section of a display of a graphical user interface 400 of an automated unloader system, such as illustrated for example in FIG. 3, in accordance with an exemplary embodiment of the present disclosure.

With reference to FIG. 3 and FIG. 4, a plurality of unloading apparatuses, such as 302, 304, 306, 308, are communicatively coupled and controlled by the control system 310. The control system 310 is integrated into the operator station 312. The operation station 312 comprises a graphical user interface 400, also referred to as user interface device, comprising a display 410 for displaying various information and data relating to the unloading apparatuses 302, 304, 306, 308 communicatively coupled to the operator station 312 and thus the control system 310.

In an exemplary embodiment, the control system 310 comprises at least one processor that is configured via computer executable instructions to perform various processes and methods. One or more application(s), application program(s) or software application(s) comprising the computer executable instructions can be stored locally in a memory of the control system 310 or the operation station 312. In another embodiment, the application(s) may be executed via cloud computing, wherein the application(s) are stored remotely in a cloud based storage system. In yet another embodiment, the application(s) may be stored in a storage system remotely, for example on a server storage system and executed via a server located for example in a mail processing facility.

The control system 310 with the at least one processor is configured to perform and monitor unloading operations of the plurality of unloaders 302, 304, 306, 308. Further, the control system 310 is configured to generate, on the display 410, an identification for each of the plurality of unloading apparatuses 302, 304, 306, 308, and an identification of an operating status for each of the plurality of unloading apparatuses 302, 304, 306, 308.

An identification for each of the plurality of unloading apparatuses 302, 304, 306, 308 comprises for example a graphical representation 402, 404, 406, 408, such as a graphical symbol or icon, including an address of each unloading apparatus, such as for example an internet protocol (IP) address 422, 424, 426, 428, when utilizing for example Ethernet or Internet as communications network 320. In our example, icon 402 represents unloader 302, icon 404 represents unloader 304, icon 406 represent unloader 306 and icon 408 represent unloader 308.

An identification of an operating status for each of the plurality of unloading apparatuses 302, 304, 306, 308 comprises for example a graphical representation including a progress bar 412, 414, 416, 418. Further, an operating status of an unloader 302, 304, 306, 308 may also be provided in form of color codes, wherein the identification, e.g. symbol or icon, of the unloader 302, 304, 306, 308 comprises and changes color (codes) according to a specific, assigned operating status for the specific color.

According to a first color code, for example comprising color 'green', indicates that an unloader operates automatically, needing no operator attention or intervention. According to a second color code, for example comprising color 'yellow', e.g. the icon or symbol of that unloader is displayed/highlighted in yellow, indicates that this unloader is operating automatically, and attempting simple, automatic exception recovery routines such as backing up a short distance, for example from a loading dock, and trying again. According to a third color code, comprising for example color 'red', of an icon or symbol of an unloader indicates that this unloader has halted operation due to a detected exception, and no longer operates automatically and needs operator attention/intervention.

In the example of FIG. 4, the unloader 302 operates automatically without operator assistance. Thus, the icon 402 of unloader 302 is color coded in green. Further, the progress bar 412 of unloader 302 indicates that the unloader has accomplished about 50% of an unloading process of unloading articles/parcels of a trailer. The unloader 304, represented by symbol 404, operates automatically and attempts simple, automatic exception recovery routines. Thus, the symbol 404 is highlighted in yellow. The progress bar 414 illustrates that the unloader just about started an unloading process. The unloader 306, represented by symbol 406, has halted or stopped operation because an exception to the automatic process was detected. Thus, the symbol 406 is color coded in red. Further, the progress bar 416 shows that an unloading process performed by the unloader 306 is almost complete. The unloader 308 provided by icon 408 is not in operation at all and the icon 408 is not color coded and the progress bar 418 does not display any progress.

The control system 310 is further configured to automatically detect an exception of the automatic unloading operations, halt the automatic unloading operations based on a detected exception, and modify on the display an identification that operation has halted. As noted, the third color code ('red') of an icon of an unloader indicates that this unloader has halted unloading operation due to a detected exception. To 'modify' comprises/means that the control system 310 is configured to change or adapt a current color code of an unloader 302, 304, 306, 308 as displayed on the display 410 to the color code that provides that operation has halted (the control system 310 generates a new color code, red, and replaces the current code, green or yellow, with the new color code).

Each unloader 302, 304, 306, 308 can operate in a mixed manual and automatic operating mode, by which it operates automatically, without interaction or intervention, until an exception is detected. The unloader(s) that have halted operation due to a detected exception need operator attention, for example unloader 306 with graphical symbol 406.

A detected exception may include for example when an unloader ceases forward motion and the flow of unloaded parcels stops. During these exceptions, a human operator takes over and resolves the exception through sophisticated techniques, such as analyzing the state of the machine and its sensors to determine the nature of the exception, retracting actuators, or retracting and advancing the automatic unloader itself. Exceptions can be detected for example utilizing one or more sensors arranged to monitor the unloaders 302, 304, 306, 308.

When a specific unloader 302, 304, 306, 308 needs operator attention, an operator (see for example operator 202 of FIG. 1) selects the specific unloader 302, 304, 306, 308 via the operator station 312, for example via an input device, such as keyboard or mouse. In another embodiment, the display 410 may be adapted as a touch screen and the operator may select the specific unloader by touching the specific icon/symbol on the display 410. After selecting the specific unloader, the operator can resolve the detected exception using the operator station, for example via certain control buttons etc. After resolving the exception, the specific unloader may start or resume automatic operations, and the color code will change accordingly.

In an exemplary embodiment, an automatic mode of an unloading apparatus is based on a closed loop control, whereby a relatively (essentially) steady flow of articles (parcels) is produced by the unloading apparatus. The closed loop is based on modulating speed with which the unloading apparatus is driven into a container being unloaded, which is directly proportional to a rate of parcels flowing from the unloader apparatus, in relation to an estimation of volume of flow, based on sensor measurement of a density of parcels at an output of the unloader and further taking into account speed of a related conveyor. When unloading articles/parcels from the container, they are placed on a conveyor for further processing, e.g. singulating, delaminating, sorting etc.

Figure 5:
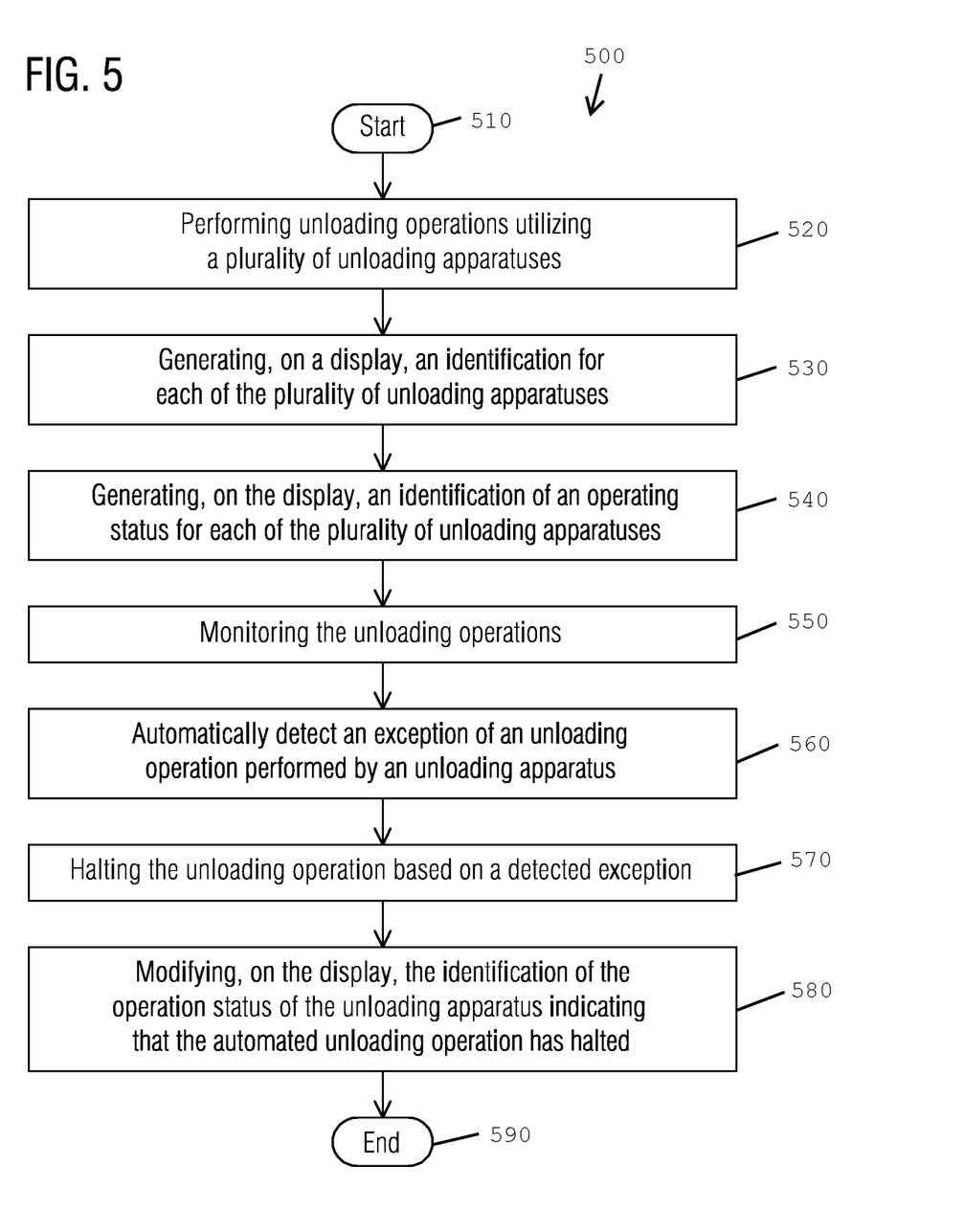
FIG. 5 depicts a flow chart of a method for unloading of articles in accordance with an exemplary embodiment of the present disclosure.

FIG. 5 depicts a flow chart of a method 500 for unloading of articles from a container or trailer in accordance with an exemplary embodiment of the present disclosure. The process or method 500 can be implemented by using any of the features, components, or devices discussed herein, or any combination of them. The method 500 is performed, for example, by an automatic unloader system 300 as disclosed herein, and under the control of its control system. While the method 500 is described as a series of acts that are performed in a sequence, it is to be understood that the method 500 may not be limited by the order of the sequence. For instance, unless stated otherwise, some acts may occur in a different order than what is described herein. In addition, in some cases, an act may occur concurrently with another act. Furthermore, in some instances, not all acts may be required to implement a methodology described herein.

The method 500 may start at 510 and may include an act 520 of performing unloading operations utilizing a plurality of unloading apparatuses 302, 304, 306, 308. The method 500 may also include act 530 of generating, on a display 410, an identification for each of the plurality of unloading apparatuses 302, 304, 306, 308, and act 540 of generating, on the display 410, an identification of an operating status for each of the plurality of unloading apparatuses 302, 304, 306, 308. Further, the method 500 may include act 550 of monitoring the unloading operations, act 560 of automatically detect an exception of an unloading operation performed by an unloading apparatus 302, 304, 306, 308, act 570 of halting the unloading operation based on a detected exception, and an act 580 of modifying, on the display 410, the identification of the operation status of the unloading apparatus 302, 304, 306, 308 indicating that the automated unloading operation has halted. At 590, the method may end. It should be appreciated that the described method 500 may include additional acts and/or alternative acts corresponding to features described with respect to the unloading system 300 and control system 310, see for example FIG. 3.

In an embodiment of the method 500, the unloading operations comprise an automatic operation mode including a closed loop control based on a substantially steady flow of articles produced the plurality of unloading apparatuses 302, 304, 306, 308. The closed loop control comprises modulating a speed of an unloading apparatus 302, 304, 306, 308 in relation to an estimation of a volume flow of the articles from the container or trailer. The estimation of the volume flow is based on one or more sensor measurement(s) of a density of the articles at an output of the unloading apparatus 302, 304, 306, 308. The estimation of the volume flow is further based on a speed of a conveyor arranged to transport the articles from the unloading apparatus.

It should be appreciated that acts associated with the above-described methodologies, features, and functions (other than any described manual acts) may be carried out by one or more data processing systems, such as for example control system 310 via operation of at least one processor. As used herein, a processor corresponds to any electronic device that is configured via hardware circuits, software, and/or firmware to process data. For example, processors described herein may correspond to one or more (or a combination) of a microprocessor, central processing unit (CPU) or any other integrated circuit (IC) or other type of circuit that is capable of processing data in a data processing system. As discussed previously, the processor 330 that is described or claimed as being configured to carry out a particular described/claimed process or function may correspond to a CPU that executes computer/processor executable instructions stored in a memory in form of software and/or firmware to carry out such a described/claimed process or function. However, it should also be appreciated that such a processor may correspond to an IC that is hard wired with processing circuitry (e.g., an FPGA or ASIC IC) to carry out such a described/claimed process or function.

In addition, it should also be understood that a processor that is described or claimed as being configured to carry out a particular described/claimed process or function may correspond to the combination of the processor with the executable instructions (e.g., software/firmware apps) loaded/installed into a memory (volatile and/or non-volatile), which are currently being executed and/or are available to be executed by the processor to cause the processor to carry out the described/claimed process or function. Thus, a processor that is powered off or is executing other software, but has the described software installed on a data store in operative connection therewith (such as on a hard drive or SSD) in a manner that is setup to be executed by the processor (when started by a user, hardware and/or other software), may also correspond to the described/claimed processor that is configured to carry out the particular processes and functions described/claimed herein.

In addition, it should be understood, that reference to "a processor" may include multiple physical processors or cores that are configures to carry out the functions described herein. Further, it should be appreciated that a data processing system may also be referred to as a controller that is operative to control at least one operation.

Figure 6:
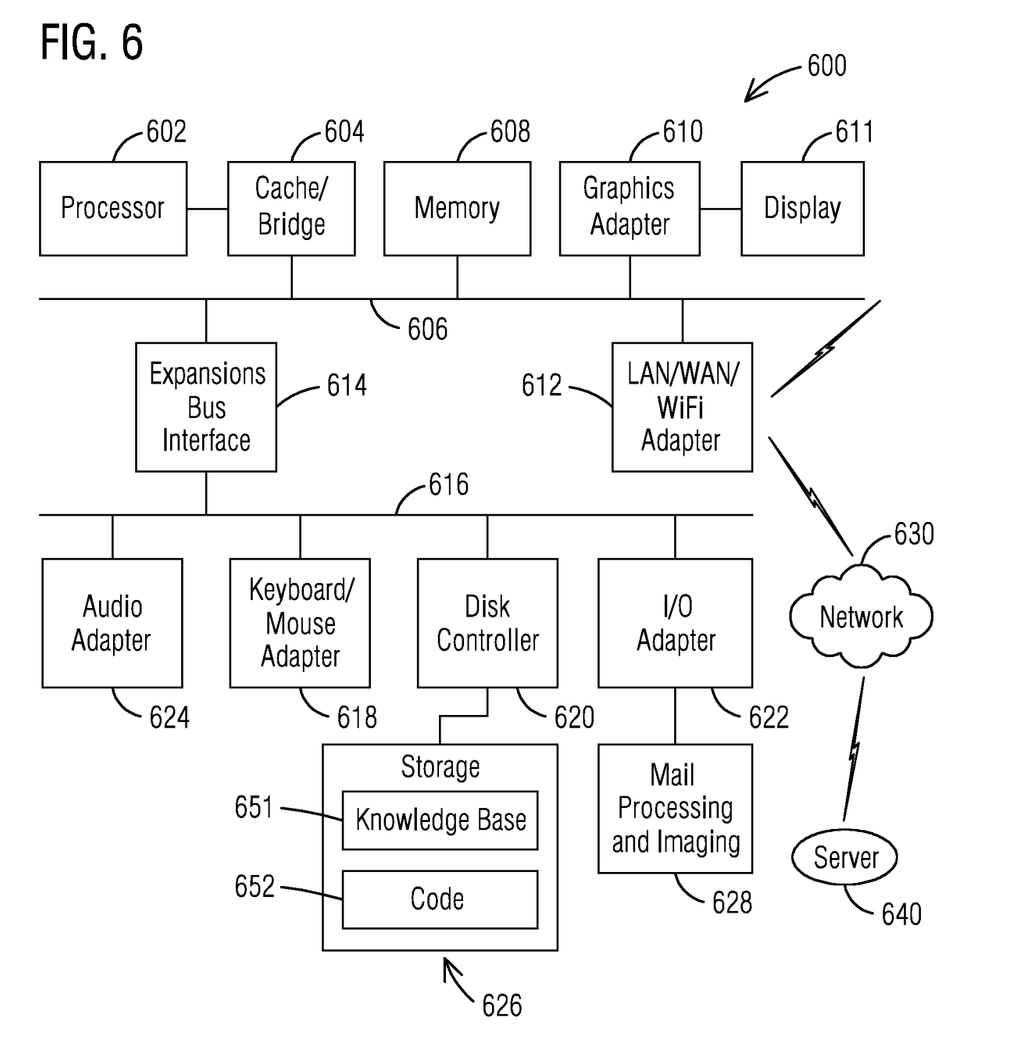
FIG. 6 depicts a block diagram of a data processing system in which an embodiment can be implemented.

It is also important to note that while the disclosure includes a description in the context of a fully functional system and/or a series of acts, those skilled in the art will appreciate that at least portions of the mechanism of the present disclosure and/or described acts are capable of being distributed in the form of computer/processor executable instructions (e.g., software and/or firmware instructions) contained within a data store that corresponds to a non-transitory machine-usable, computer-usable, or computer-readable medium in any of a variety of forms. The computer/processor executable instructions may include a routine, a sub-routine, programs, applications, modules, libraries, and/or the like. Further, it should be appreciated that computer/processor executable instructions may correspond to and/or may be generated from source code, byte code, runtime code, machine code, assembly language, Java, JavaScript, Python, Julia, C, C#, C++ or any other form of code that can be programmed/configured to cause at least one processor to carry out the acts and features described herein. Still further, results of the described/claimed processes or functions may be stored in a computer-readable medium, displayed on a display device, and/or the like FIG. 6 depicts a block diagram of a data processing system 600 in which an embodiment can be implemented, for example as a control system 310, see FIG. 3, for mechanisms as described herein and can be configured to perform processes as described herein.

The data processing system 600 depicted includes a processor 602 connected to a level two cache/bridge 604, which is connected in turn to a local system bus 606. Local system bus 606 may be, for example, a peripheral component interconnect (PCI) architecture bus. Also connected to local system bus in the depicted example are a main memory 608 and a graphics adapter 610. The graphics adapter 610 may be connected to display 611.

Other peripherals, such as local area network (LAN)/wide area network (WAN)/Wireless (e.g., Wi-Fi) adapter 612, may also be connected to local system bus 606. Expansion bus interface 614 connects local system bus 606 to input/output (I/O) bus 616. I/O bus 616 is connected to keyboard/mouse adapter 618, disk controller 620, and I/O adapter 622. Disk controller 620 can be connected to a storage 626, which can be any suitable machine usable or machine readable storage medium, including but not limited to non-volatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

I/O adapter 622 can be connected to mail processing and imaging devices 628, as described herein, to image, scan, transport, label, address process, sort, and otherwise processes the mail pieces in accordance with the various embodiments described herein. Also connected to I/O bus 616 in the example shown is audio adapter 624, to which speakers (not shown) may be connected for playing sounds. Keyboard/mouse adapter 618 provides a connection for a pointing device (not shown), such as a mouse, trackball, track-pointer, etc.

Those of ordinary skill in the art will appreciate that the hardware depicted in FIG. 6 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

The data processing system 600 in accordance with an embodiment of the present disclosure includes an operating system employing a graphical user interface, see also for example FIG. 4. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response. One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 612 can be connected to a network 630 (not a part of data processing system 600), which can be any public or private data processing system network or combination of networks, as known to those of skill in the art, including the Internet. LAN/WAN/Wireless adapter 612 can also communicate with packages as described herein and perform other data processing system or server processes described herein. Data processing system 600 can communicate over network 630 with one or more server systems 640, which are also not part of data processing system 600, but can be implemented, for example, as separate data processing systems 600. A server system 640 can be, for example, a central server system at a central mail processing facility.

The invention claimed is:

1. A system for unloading articles from a container or trailer comprising:
    a plurality of unloading apparatuses, each unloading apparatus being configured to unload articles from a container or trailer, and
    an operator station comprising a control system,
    wherein each of the plurality of unloading apparatuses is coupled to the operator station such that each of the plurality of unloading apparatuses is controlled via the control system,
    wherein the operator station comprises a graphical user interface and control elements for an operator to drive the plurality of unloading apparatuses, and
    wherein each unloading apparatus is positioned at a truck dock and operated to unload a trailer or container, wherein the operator drives each unloading apparatus via the operator station consecutively.

2. The system of claim 1, wherein the operator station is remote from the plurality of unloading apparatuses.

3. The system of claim 1, wherein the operator station comprises a graphical user interface and control elements for an operator to drive the plurality of unloading apparatuses.

4. The system of claim 1, wherein each unloading apparatus comprises a duty cycle of productive unloading activities and non-productive activities, wherein the operator drives a first unloading apparatus during productive unloading activities while a second unloading apparatus is in non-productive activities.

5. The system of claim 3, wherein the control system comprises at least one processor configured via computer executable instructions to:
    generate, via the graphical user interface, an identification for each of the plurality of unloading apparatuses, and generate, via the graphical user interface, an identification of an operating status for each of the plurality of unloading apparatuses,
wherein the operator selects a specific unloading apparatus via the graphical user interface to drive and perform productive unloading activities.

6. The system of claim 5, wherein the control system comprising the at least one processor is further configured to:
monitor the productive unloading activities,
automatically detect an exception of an unloading activity performed by a first unloading apparatus,
halt the unloading activity based on a detected exception, and
modify, via the graphical user interface, the identification of the operation status of the first unloading apparatus indicating that unloading operation has halted.

7. The system of claim 1, further comprising a communications network interfacing with the plurality of unloading apparatus and the operator station.

8. The system of claim 7, wherein the communications network comprises Ethernet.

9. A method for unloading of articles from a container or trailer comprising:
coupling a plurality of unloading apparatuses to an operator station comprising a control system, each unloading apparatus being configured to unload articles from a container or trailer, and
controlling each of the plurality of unloading apparatuses via the operation station and control system,
and further comprising:
generating, on a display of the operator station, an identification for each of the plurality of unloading apparatuses,
generating, on the display, an identification of an operating status for each of the plurality of unloading apparatuses,
monitoring the unloading operations,
automatically detect an exception of an unloading operation performed by an unloading apparatus,
halting the unloading operation based on a detected exception, and
modifying, on the display, the identification of the operation status of the unloading apparatus indicating that the unloading operation has halted.

10. The method of claim 9, wherein the plurality of unloading apparatuses are controlled by a single operator station or a single control system.

11. The method of claim 9, further comprising:
selecting a first unloading apparatus via the operator station,
performing unloading activities of the first unloading apparatus while a second unloading apparatus is in a non-unloading operating status,
selecting the second unloading apparatus via the operator station,
performing productive unloading activities of the second unloading apparatus while the first unloading apparatus is in a non-unloading operating status.

12. A system for automatic unloading of articles from a container or trailer comprising:
a control system comprising at least one processor configured via computer executable instructions to:
generate, on a display, an identification for each of a plurality of unloading apparatuses configured to unload articles from a container or trailer,
generate, on the display, an identification of an operating status for each of the plurality of unloading apparatuses,
automatically detect an exception of an unloading operation performed by an unloading apparatus,
halt the unloading operation based on a detected exception, and
modify, on the display, the identification of the operation status of the unloading apparatus indicating that the unloading operation has halted.

13. The system of claim 12, wherein the identification for the plurality of unloading apparatuses comprises a graphical representation including a symbol or icon for each unloading apparatus.

14. The system of claim 12, wherein the identification for the plurality of unloading apparatuses comprises an Internet Protocol (IP) address for each unloading apparatus.

15. The system of claim 12, wherein the identification of an operating status for the plurality of unloading apparatuses comprises a graphical representation including a progress bar illustrating progress of the unloading operation for each unloading apparatus.

16. The system of claim 15, wherein the identification of an operating status for the plurality of unloading apparatuses comprises color coding of the graphical representation of each unloading apparatus.

17. The system of claim 16, wherein a first color code indicates that the unloading apparatus operates without operator intervention,
wherein a second color code indicates that the unloading apparatus attempts exception recovery routines, and
wherein a third color code indicates that the unloading apparatus halted operations due to a detected exception.

18. The system of claim 12, wherein the unloading operations comprise an automatic operation mode with a closed loop control based on a substantially steady flow of articles produced by the unloading apparatuses.

* * * * *